(12) United States Patent
Fukumoto

(10) Patent No.: US 7,835,161 B2
(45) Date of Patent: *Nov. 16, 2010

(54) DC-AC CONVERTER AND METHOD OF SUPPLYING AC POWER

(75) Inventor: Kenichi Fukumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/536,279

(22) Filed: Aug. 5, 2009

(65) Prior Publication Data

US 2010/0014336 A1 Jan. 21, 2010

Related U.S. Application Data

(60) Division of application No. 12/135,897, filed on Jun. 9, 2008, now Pat. No. 7,589,981, which is a continuation of application No. 11/837,421, filed on Aug. 10, 2007, now Pat. No. 7,403,401, which is a continuation of application No. 11/428,189, filed on Jun. 30, 2006, now Pat. No. 7,272,022, which is a continuation of application No. 10/495,965, filed as application No. PCT/JP03/09385 on Jul. 24, 2003, now Pat. No. 7,095,632.

(30) Foreign Application Priority Data

Sep. 30, 2002 (JP) ............................. 2002-285015

(51) Int. Cl.
*H02M 3/335* (2006.01)
*H02M 3/24* (2006.01)
*H02M 7/5387* (2006.01)
*H02H 7/122* (2006.01)
*H02J 1/00* (2006.01)

(52) U.S. Cl. .................. 363/17; 363/56.02; 363/98; 363/132

(58) Field of Classification Search ............ 363/16, 363/17, 56.01, 56.02, 97, 98, 131, 132
See application file for complete search history.

(56) References Cited

U.S. PATENT DOCUMENTS 5,946,200 A 8/1999 Kim et al. .................. 363/17

(Continued)

FOREIGN PATENT DOCUMENTS

JP 8-205548 8/1996

(Continued)

*Primary Examiner*—Matthew V Nguyen
(74) *Attorney, Agent, or Firm*—DLA Piper LLP (US)

(57) ABSTRACT

A dc-ac converter capable of supplying a finely regulated ac drive voltage to a load is provided. For this purpose, the converter includes, in a primary winding of a transformer, a full-bridge or half-bridge type semiconductor switch circuit whose switch can be controlled by pulse-width modulation. Transformer has a secondary winding for connection with a load. Based on PWM signals and by use of adequate switching logics for controlling multiple semiconductor switches, sophisticated control including zero-current switching and penetrating current prevention can be effected. Moreover, by means of regulated burst control of the ratio of on-duty period to off-duty period together with pulse-width modulation control, power supplied to the load can be regulated over a wide range beyond the limits of control obtained by the pulse-width modulation.

10 Claims, 7 Drawing Sheets

U.S. PATENT DOCUMENTS

| | | | |
|---|---|---|---|
| 6,038,142 A | 3/2000 | Fraidlin et al. | 363/17 |
| 6,259,615 B1 | 7/2001 | Lin | |
| 6,356,462 B1 | 3/2002 | Jang et al. | 363/17 |
| 6,927,989 B2 | 8/2005 | Fukumoto | 363/95 |
| 6,982,886 B2 | 1/2006 | Fukumoto | 363/72 |
| 6,982,889 B2 | 1/2006 | Fukumoto | 363/98 |
| 6,992,902 B2 | 1/2006 | Jang et al. | 363/17 |
| 7,046,532 B2 | 5/2006 | Masuo et al. | 363/65 |
| 7,095,632 B2 | 8/2006 | Fukumoto | 363/17 |
| 7,099,168 B2 | 8/2006 | Fukumoto | 363/98 |
| 7,126,831 B2 | 10/2006 | Toda et al. | 363/26 |
| 7,136,294 B2 | 11/2006 | Phadke et al. | 363/132 |
| 7,248,488 B2 | 7/2007 | Toda et al. | 363/26 |
| 7,292,463 B2 | 11/2007 | Fukumoto | 363/98 |
| 7,339,802 B2 | 3/2008 | Fukumoto | 363/21.09 |
| 7,466,566 B2 | 12/2008 | Fukumoto | 363/17 |
| 7,492,620 B2 | 2/2009 | Fukumoto | 363/98 |
| 7,589,981 B2 * | 9/2009 | Fukumoto | 363/17 |
| 7,599,202 B2 * | 10/2009 | Fukumoto | 363/131 |
| 2004/0240234 A1 | 12/2004 | Toda et al. | 363/22 |
| 2005/0007794 A1 | 1/2005 | Fukumoto | 363/16 |
| 2005/0219863 A1 | 10/2005 | Fukumoto et al. | 363/16 |
| 2007/0279946 A1 | 12/2007 | Toda et al. | 363/26 |
| 2007/0285955 A1 | 12/2007 | Fukumoto | 363/72 |
| 2008/0158916 A1 | 7/2008 | Fukumoto | 363/21.09 |
| 2009/0021970 A1 * | 1/2009 | Fukumoto | 363/131 |
| 2009/0072754 A1 * | 3/2009 | Fukumoto | 315/279 |
| 2009/0237969 A1 * | 9/2009 | Fukumoto et al. | 363/97 |
| 2010/0014336 A1 * | 1/2010 | Fukumoto | 363/132 |

FOREIGN PATENT DOCUMENTS

| | | |
|---|---|---|
| JP | 10-050489 | 2/1998 |
| JP | 10-285942 | 10/1998 |
| WO | WO 98/35434 | 8/1998 |

\* cited by examiner

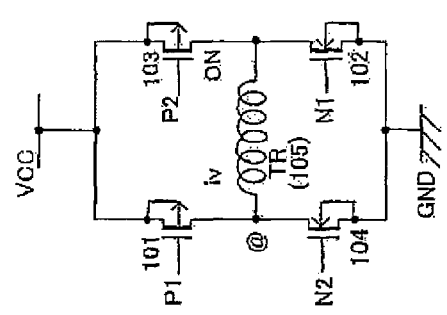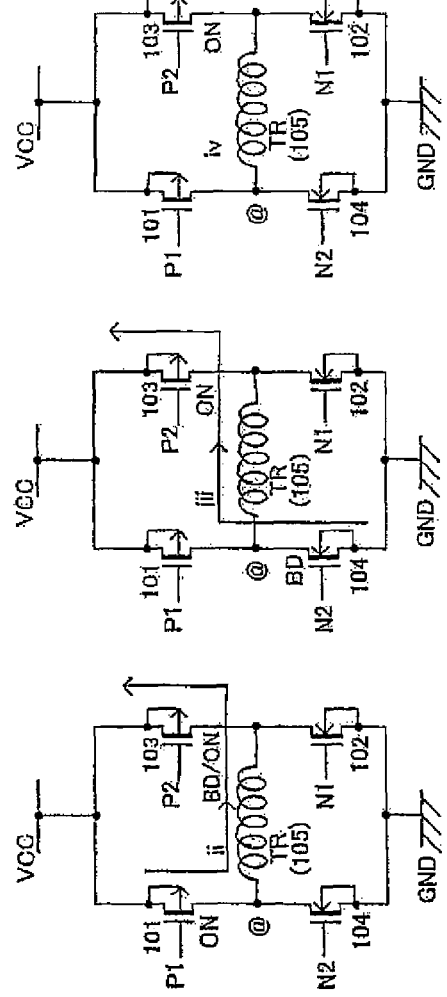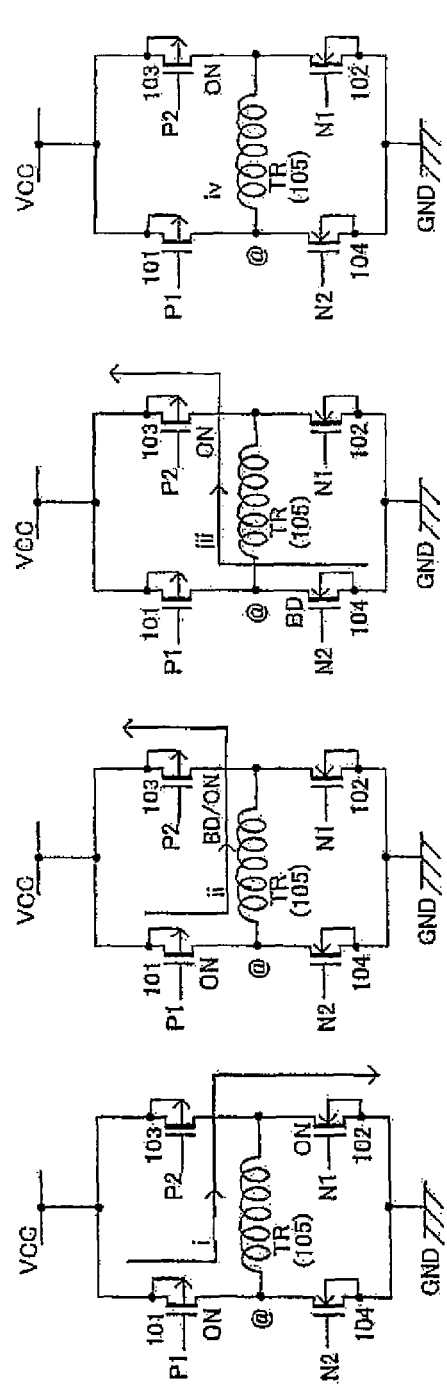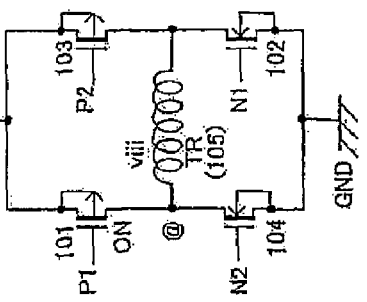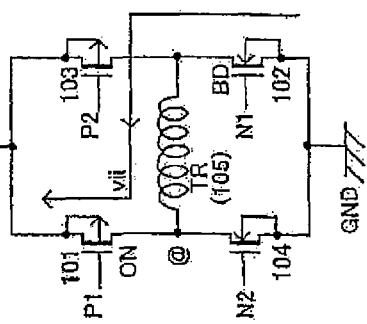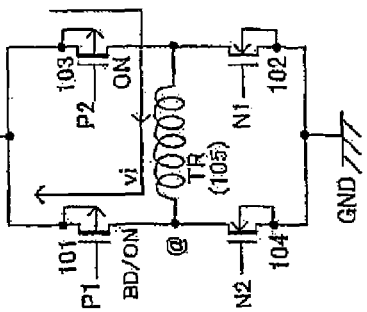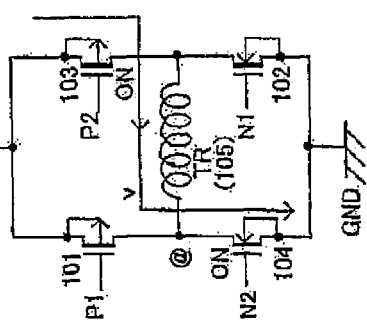

US 7,835,161 B2

DC-AC CONVERTER AND METHOD OF SUPPLYING AC POWER

CROSS-REFERENCE TO THE RELATED APPLICATIONS

This is a divisional of application Ser. No. 12/135,897 filed Jun. 9, 2008, which is now a U.S. Pat. No. 7,589,981, which is a continuation of application Ser. No. 11/837,421 filed Aug. 10, 2007, which is now a U.S. Pat. No. 7,403,401, which is a continuation of application Ser. No. 11/428,189 filed Jun. 30, 2006, which is now a U.S. Pat. No. 7,272,022, which is a continuation of application Ser. No. 10/495,965 filed May 18, 2004, which is now a U.S. Pat. No. 7,095,632, which is a national phase of PCT application No. PCT/JP03/09385 filed Jul. 24, 2003 which applications are hereby incorporated by reference in their entirety. This application also claims benefit of priority under 35 U.S.C. §119 to Japanese Patent Application No. 2002-285015 filed Sep. 30, 2002, the entire contents of which are incorporated by reference.

TECHNICAL FIELD

This invention relates to a dc-ac converter (hereinafter referred to as inverter) for generating ac power to drive a load from a do power supply unit such as a power supply adapter of an electric appliance and a battery. The invention also relates to a method of supplying ac power to a load.

BACKGROUND ART

A cold cathode fluorescent light (CCFL) has been increasingly used as a back light source of a liquid crystal display monitor of a notebook PC and of a liquid crystal display (LCD) for use with, for example, a TV set. Such CCFL has substantially the same high efficiency and life as a usual hot cathode fluorescent light, without using a filament of the hot cathode fluorescent light.

In order to start up and operate the CCFL, a high ac voltage is required. For example, a startup voltage of about 1000 V and an operating voltage of about 600 V are required. These high ac voltages are generated from a dc power supply unit of, for example, a notebook PC and a liquid crystal TV set, using an inverter.

Conventionally, a Royer circuit has been used as an inverter for the CCFL. The Royer circuit comprises a saturable magnetic core transformer and control transistors, and is adapted to undergo a self-sustaining oscillation owing to the nonlinear permeability of the saturable magnetic core and the nonlinear current gain characteristic of the control transistors. The Royer circuit itself requires no external clock or driver circuit.

However, a Royer circuit is basically a constant-voltage inverter, which cannot maintain a constant output voltage if the input voltage thereto and/or the load current thereof varies. Hence, in order to maintain a constant input voltage to the Royer circuit, a regulator for supplying electric power to the Royer circuit is required. For this reason, besides the inverter utilizing a Royer circuit has low power inversion efficiency, it is difficult to miniaturize such inverter.

A CCFL inverter having improved power conversion efficiency has been disclosed (see for example Japanese Patent Early Publication H10-50489). This inverter comprises a first semiconductor switch connected in series with the primary winding of a transformer, a serially connected second semiconductor switch and a capacitor which are connected in parallel with the primary winding, and a coupling capacitor and a load connected in series with the secondary winding of the transformer. The first and second semiconductor switches are switched on and off by a control signal received from s control circuit to supply ac power to the load.

A full-bridge (often called H bridge) type CCFL inverter utilizing four semiconductor switches has been proposed (see for example U.S. Pat. No. 6,259,615). This inverter has a transformer having its primary winding connected to the output terminal of the full-bridge via a resonant capacitor connected in series with the primary winding. The load is connected to the secondary winding of the transformer. Of the four semiconductor switches constituting the full-bridge, a first set of two semiconductor switches establishes a current path in a first direction to the primary winding of the transformer and a second set of two semiconductor switches establishes a current path in a second direction to the primary winding. The control circuit provides the full-bridge semiconductor switches with control signals each having a fixed pulse width and a controlled relative position of the pulse, thereby regulating the power given to the load.

Conventional inverters utilizing Royer circuit are not only difficult to be miniaturized but also disadvantageous in that their conversion efficiencies are low. In the inverter as disclosed in the first referenced document, the load current and load voltage cannot be detected accurately, since the primary circuit of the transformer includes capacitors, and since control signals are formed based on the primary current. On the other hand, the inverter as disclosed in the second referenced document is configured to have a serially connected capacitor in the primary winding and control ON-OFF operation of the full-bridge semiconductor switch by control signals having a fixed pulse width and controlled relative pulse positions in regulating the power to be supplied to the load. Hence, the inverter has a structural limitation that the four semiconductor switches must be of the same conduction type. Moreover, the prior art inverters have difficulty to regulate the power supplied to the load, over a wide range, especially for the purpose of dimmer control.

The invention, therefore, provides an inverter for generating from a de power supply an ac voltage for driving a load, the inverter comprising a transformer having a primary winding that includes a semiconductor switch circuit in the form of a half-bridge or full-bridge, and a secondary winding connectable to a load. The invention is directed to an inverter capable of finely regulating the power supplied to a load by implementing means for controlling the semiconductor switch circuit through pulse-width modulation (PWM), performing zero-current switching of the switch circuit, and preventing penetration current from occurring.

The invention is also directed to an inverter capable of finely regulating power supplied to a load over a wide range, especially during dimmer control for example.

DISCLOSURE OF INVENTION

A dc-ac converter in accordance with one aspect of the invention comprises:
   a dc power supply;
   a transformer having a primary winding and at least one secondary winding;
   a switch circuit having
     a first and a second semiconductor switches connected in series via the primary winding, the first and second switches capable of flowing a current in a first direction from the dc power supply to the primary winding, and
     a third and fourth semiconductor switches connected in series via the primary winding, the third and fourth switches capable of flowing a current in a second direction from the dc power supply to the primary winding;

a current detection circuit for detecting a detection current associated with a current that flows through a load connected to the secondary winding;

a triangular signal generation circuit for generating a triangular signals for pulse-width modulation (PWM) (the train of signals herein after referred to as PWM triangular signal train or, simply, triangular signal train);

a PWM circuit for generating a PWM signal upon comparison of a feedback signal based on the detection current received from the current detection circuit with the triangular signal train; and a logic circuit for outputting based on the PWM signals, switch signals that include a first switch signal for switching on/off the first semiconductor switch, a second switch signal for switching on/off the second semiconductor switch, a third switch signal for switching on/off the third semiconductor switch, and a fourth switch signal for switching on/off the fourth semiconductor switch, wherein the logic circuit is configured to alternately establish a first current path for allowing a current to flow in the first direction by simultaneously switching on the first and second switches and a second current path for allowing a current to flow in the second direction by simultaneously switching on the third and fourth switches, establish a first simultaneous OFF period during which the first and fourth switches are simultaneously switched off and a second simultaneous OFF period during which the third and second switches are simultaneously switched off, and switch the direction of the current flowing through the primary winding from one direction to the other when the magnitude of the current is zero.

The first through fourth switches may be switched such that the second switch is switched on at every other apex of the triangular signal train on one side of the train with respect the average level of the train and remains turned on until a triangular signal becomes equal in magnitude to the feedback signal immediately after the second switch is turned on;

the first switch is switched on a first predetermined time before the second switch is turned on and remains turned on until a triangular signal reaches its apex on the other side thereof immediately after the second switch is turned off, the fourth switch is turned on at every other apex which is different from the apices associated with the second switch but is on the same one side as the apices, and remains turned on until a triangular signal becomes equal in magnitude to the feedback signal immediately after the fourth switch is turned on;

the third switch is switched on a second predetermined time before the fourth switch is turned on while the second switch is turned off and the first switch is turned on, and remains turned on until a triangular signal reaches its apex on the other side thereof immediately after the fourth switch is turned off and the first and second predetermined times are respectively set to lengths such that either one of the first and third switches is always switched on.

The converter may further comprise:

a voltage detection circuit for detecting the voltage supplied to the load connected to the secondary winding to generate a detection voltage; and a feedback signal control circuit for comparing the detection voltage with a reference detection voltage to generate an error signal indicative of the difference between them and to control the feedback signal based on the error signal.

The converter may be provided with a burst control signal generation circuit for generating a burst control signal for setting an on-duty period to control the first through fourth switches of the switch circuit based on the PWM signals and an off-duty period to disable the switch circuit irrespective of the PWM signals received, whereby the ratio of the on-duty period to the off-duty period is regulated.

The burst control signal generation circuit has an oscillator circuit for generating a triangular signal to initiate a burst (the triangular signal referred to as burst triangular signal), and is adapted to generate a burst control signal based on the comparison of the burst triangular signal with a duty signal having an arbitrarily adjustable magnitude.

The inverter may further comprise a control mode switching circuit for switching the mode of control between a burst control mode and a PWM control mode by deciding whether the magnitude of the detection current detected by the current detection circuit is to be limited to a predetermined level or not based on the burst control signal.

A method of supplying ac power to a load connected to a secondary winding of a transformer in accordance with a further aspect of the invention comprises steps of:

connecting across a dc power supply a first semiconductor switch and a second semiconductor switch connected in series via a primary winding of the transformer to allow a current to flow in a first direction through the primary winding;

connecting across the dc power supply a third semiconductor switch and a fourth semiconductor switch connected in series via the primary winding to allow a current to flow in a second direction through the primary winding;

detecting the current (referred to as detection current) flowing through the load connected to the secondary winding by means of a current detection circuit;

forming a feedback signal based on the detection current detected by the current detection circuit;

generating a pulse-width modulation (PWM) signal upon comparison of the feedback signal with a train of triangular signals (referred to as triangular signal train; and generating a first switch signal for switching on the first semiconductor switch, a second switch signal for switching on the second semiconductor switch, a third switch signal for switching on the third semiconductor switch, and a fourth switch signal for switching on the fourth semiconductor switch based on the PWM signal such that a first simultaneous OFF period is established during which the first and fourth switches are simultaneously turned off and second simultaneous OFF period is established during which the third and second switches are simultaneously turned off, and the direction of the current flowing through the primary winding is changed from one direction to the other when the magnitude of the current is zero.

The first through fourth switches may be switched on such that the second switch is switched on at every other apex of the triangular signal train on one side thereof and remains turned on until a triangular signal becomes equal in magnitude to the feedback signal immediately after the second switch is turned on;

the first switch is switched on a first predetermined time before the second switch is turned on and remains turned on until a triangular signal reaches its apex on the other side thereof immediately after the second switch is turned off;

the fourth switch is turned on at every other apex which is different from the apices associated with the second switch but is on the same one side as the apices, and remains tuned on until a triangular signal becomes equal in magnitude to the feedback signal immediately after the fourth switch is turned on;

the third switch is switched on a second predetermined time before the fourth switch is turned on while the second switch is turned off and the first switch is turned on, and remains turned on until a triangular signal reaches its apex on the other side thereof immediately after the fourth switch is turned off; and the first and second predetermined times are respectively set to lengths such that either one of the first and third switches is always switched on.

A dc-ac converter in accordance with still another aspect of the invention comprises:

a dc power supply;

a transformer having a primary winding and at least one secondary winding;

a switch circuit having a first capacitor and a first semiconductor switch connected in series via the primary winding and adapted to allow a current to flow in a first direction from the dc power supply to the primary winding;

a second semiconductor switch and a second capacitor connected in series via the primary winding and adapted to allow a current to flow in a second direction from the dc power supply to the primary winding;

a current detection circuit for detecting detection current associated with the current that flows through a load connected to the secondary winding;

a triangular signal generation circuit for generating a PWM triangular signal train;

a PWM circuit for generating a PWM signal upon comparison of a feedback signal based on the detection current received from the current detection circuit with the triangular signal train; and a logic circuit for outputting a first switch signal for switching on/off the first semiconductor switch, and a second switch signal for switching on/off the second semiconductor switch, based on the PWM signals, wherein the logic circuit is configured to alternately establish a first current path for allowing a current to flow in the first direction through the first switch coupled with the first capacitor by switching on the first switch and a second current path for allowing a current to flow in the second direction through the second switch coupled with the second capacitor by switching on the second switch, establish a simultaneous OFF period during which the first and second switches are simultaneously switched off, and switch the direction of the current flowing through the primary winding from one direction to the other when the magnitude of the current is zero.

The first and second switches may be switched on such that:

the first switch is switched on at every other apex of the triangular signal train on one side thereof with respect to the avenge level of the train and remains turned on until a triangular signal becomes equal in magnitude to the feedback signal immediately after the first switch is turned on; and the second switch is turned on at every other apex which is different from the apices associated with the first switch but is on the same one side as the apices, and remains turned on until a triangular signal becomes equal in magnitude to the feedback signal immediately after the second switch is turned on.

In accordance with a further aspect of the invention, a method of supplying ac power to a load connected to a secondary winding of a transformer comprises steps of:

connecting across a de power supply a first capacitor in series with a first semiconductor switch via a primary winding of the transformer to allow a current to flow in a first direction through the primary winding;

connecting across the dc power supply a second semiconductor switch and a second capacitor connected in series via the primary winding to allow a current to flow in a second direction through the primary winding;

detecting the current (referred to as detection current) flowing through the load connected to the secondary winding by means of a current detection circuit;

forming a feedback signal based on the detection current detected by the current detection circuit;

generating a pulse width modulation (PWM) signal upon comparison of the feedback signal with triangular signal train; and generating a first switch signal for switching on the first semiconductor switch and a second switch signal for switching on the second semiconductor switch such that:

a simultaneous OFF period is established during which the first and second switches are simultaneously turned off; and the direction of the current flowing through the primary winding is changed from one direction to the other when the magnitude of the current is zero.

An inverter of the invention generates an ac voltage from a dc power supply for driving a load connected to a secondary winding of a transformer. The inverter is equipped with a full-bridge or a half-bridge type semiconductor switch circuit formed in the primary winding of the transformer. Transformer has a secondary winding for connection with a load. The switch circuit is adapted to feed back the current flowing in the load to carry out PWM control of the respective switches of the circuit, thereby enabling fine regulation of the electric power supplied to the load.

The invention also enables sophisticated control including zero-current switching, penetrating current prevention, and reduction of switching loss by employing adequate switching logics to the control of a multiplicity of semiconductor switches using pulse-width modulation (PWM) signals.

Moreover, power supplied to the load can be widely regulated beyond the limit of the PWM control by executing adjustable burst control of the on-duty to off-duty ratio along with PWM control.

BRIEF DESCRIPTION OF DRAWINGS

FIG. 5 shows operating conditions of a full-bridge at different stages of timing.

BEST MODE FOR CARRYING OUT THE INVENTION

The invention will now be described in detail by way of example with reference to the accompanying drawings illustrating an ac inverter for generating from a dc power supply an ac voltage to drive a load, and a method of supplying ac power to the load.

Figure 1:
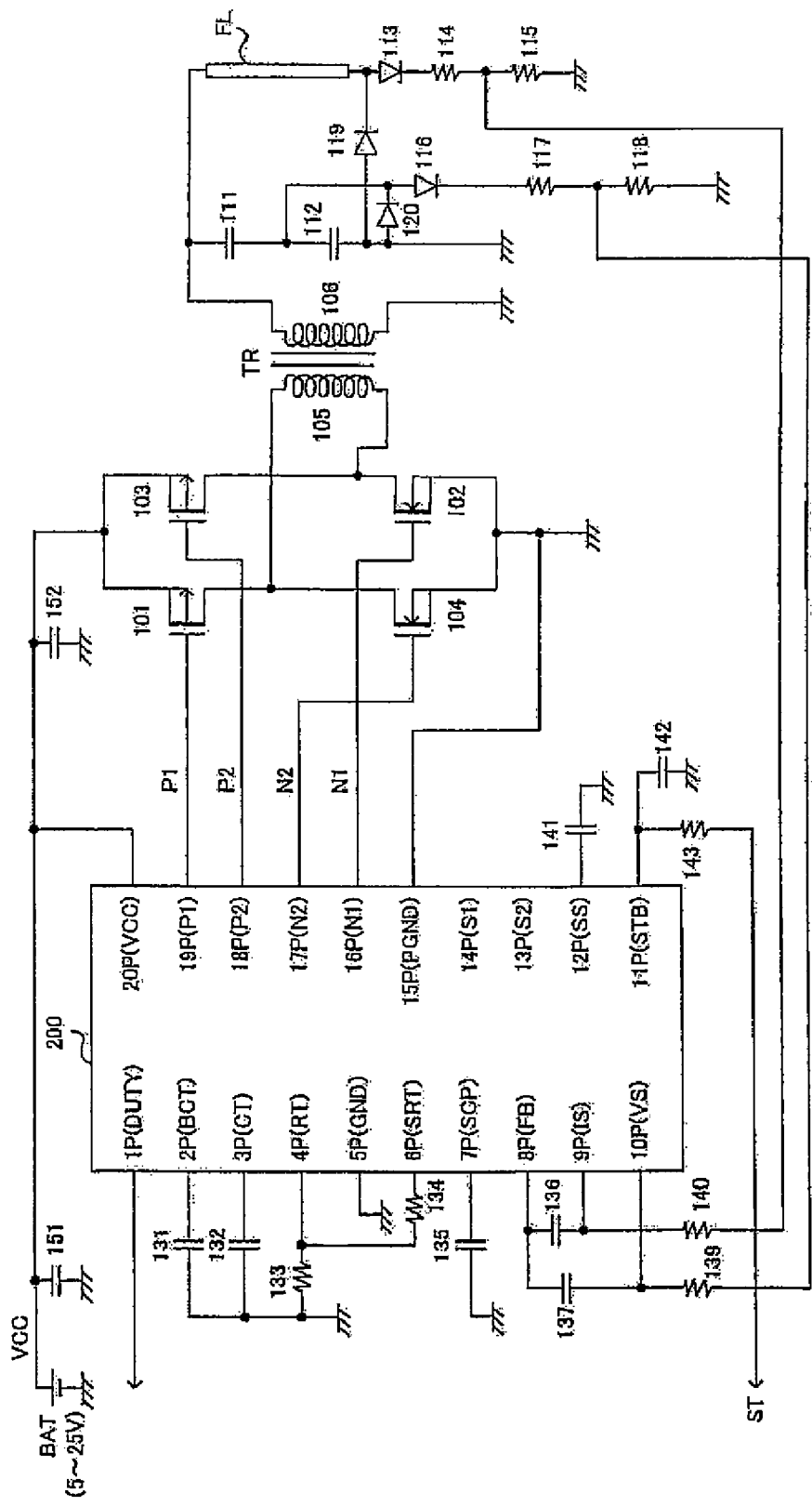
FIG. 1 is a schematic diagram showing an over-all arrangement of an inverter in accordance with a first embodiment of the invention.
Figure 2:
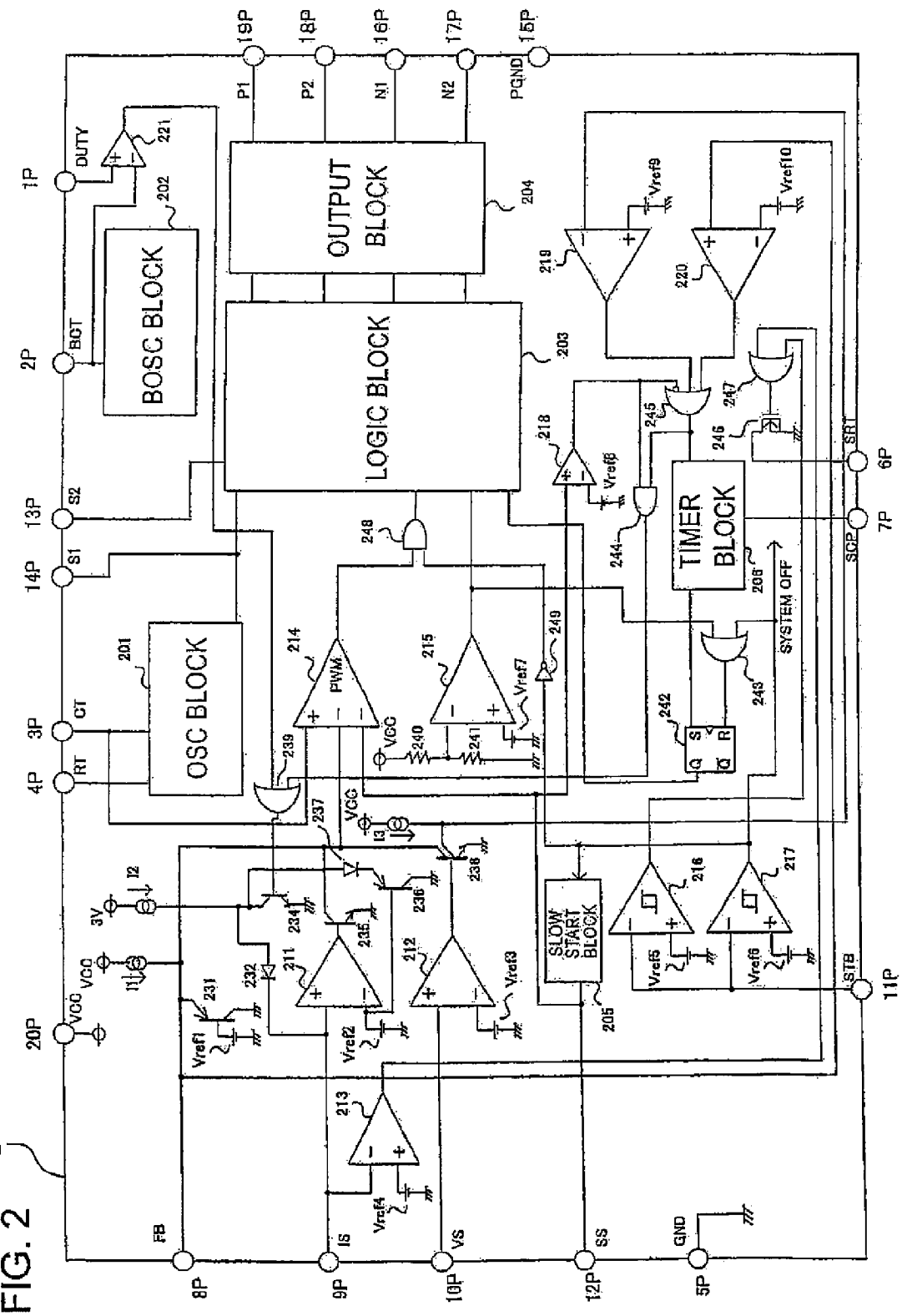
FIG. 2 is a schematic diagram showing an internal structure of a controller IC for use in the inverter of FIG. 1.
Figure 3:
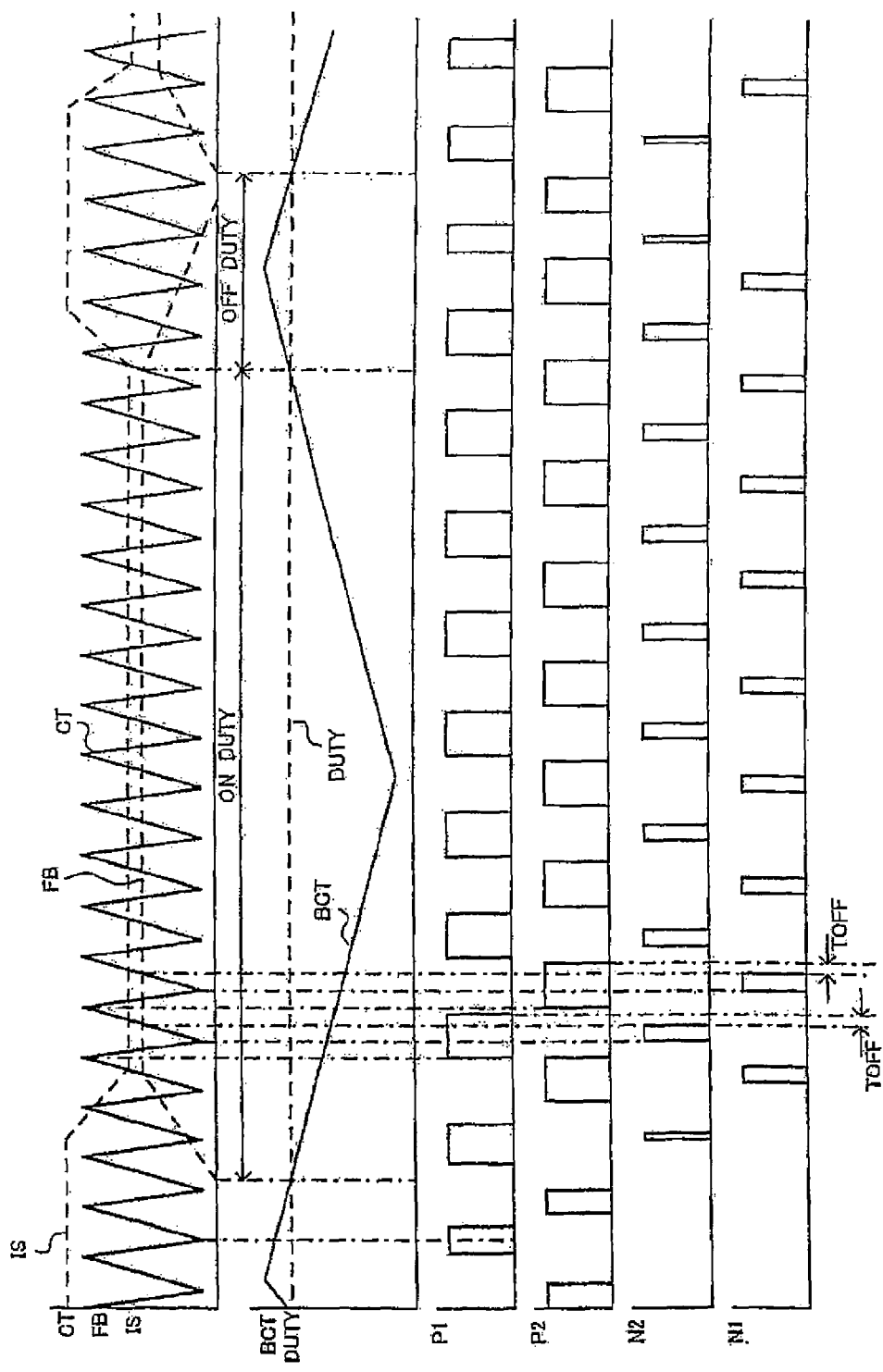
FIG. 3 is a timing diagram for the inverter of FIG. 1.
Figure 4:
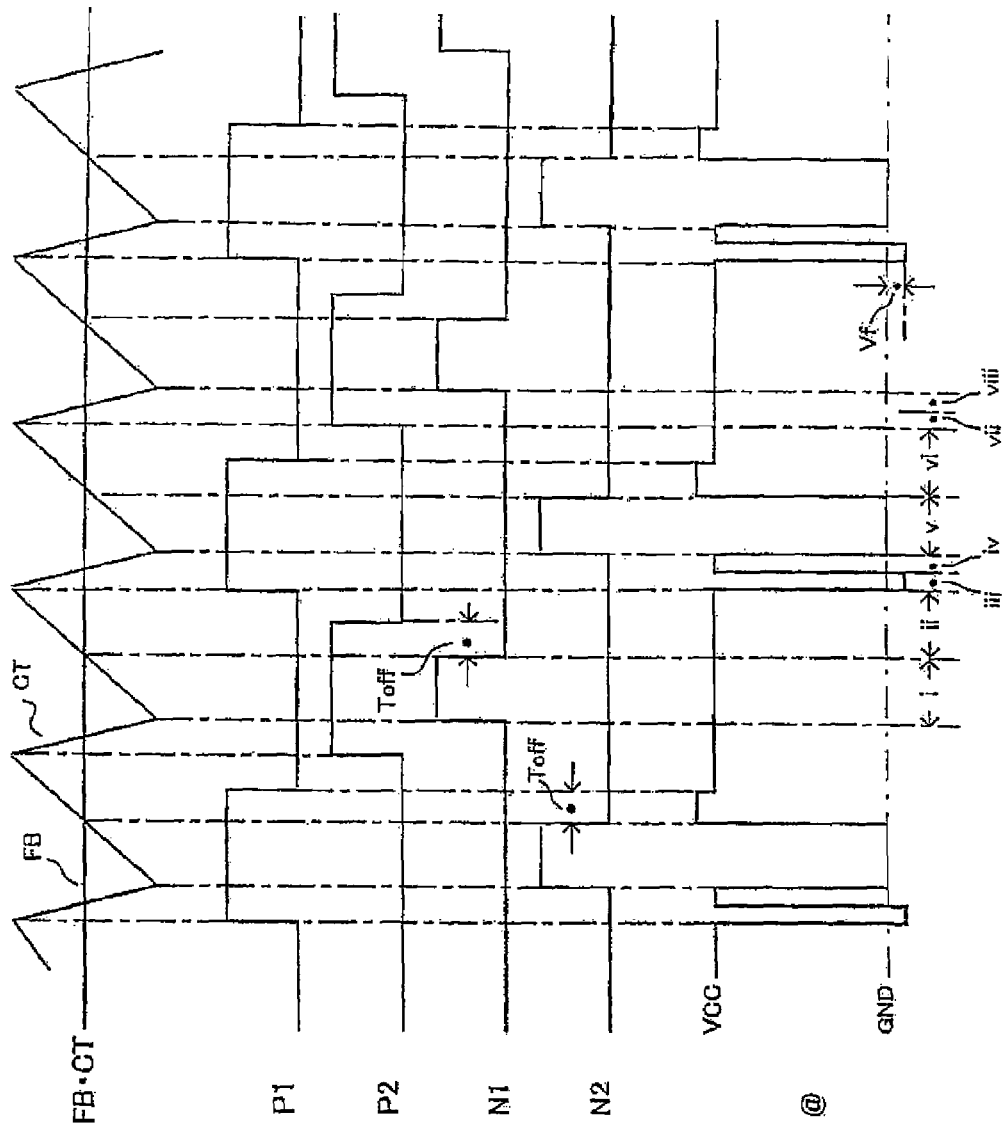
FIG. 4 is a timing diagram useful in describing in detail a part of FIG. 3.

Referring to FIG. 1, there is shown an over-all arrangement of a first inverter according to the invention that utilizes an insulated transformer and a full-bridge switch circuit to carry out PWM control. FIG. 2 illustrates the internal structure of a controller IC (i.e. IC for controlling inverter) for use in the inverter of FIG. 1. FIG. 3 is a timing diagram for a first embodiment. FIG. 4 is a timing diagram illustrating further details of a part of the timing diagram shown in FIG. 3. FIG. 5 illustrates the operating conditions of the full-bridge at different stages the each timing.

As shown in FIG. 1, a first switch in the form of a P-type MOSFET (hereinafter referred to as PMOS) 101 and a second switch in the form of an N-type MOSFET (hereinafter referred to as NMOS) 102 constitute a current path in a first direction to the primary winding 105 of a transformer TR. A third switch in the form of a PMOS 103 and a fourth switch in the form of NMOS 104 constitutes a second current path in a second direction to the primary winding 105 of the transformer TR. Each of the PMOSs 101 and 103 and NMOSs 102 and 104 has a body diode (that is, a back gate diode).

The body diode enables a current to flow in the direction opposite to the forward direction of the current. Additional diodes may be provided to provide the same function as the body diodes.

A power supply voltage VCC is supplied from a dc power supply BAT to the primary winding 105 of the transformer TR through the PMOSs 101 and 103 and NMOSs 102 and 104 to induce a high voltage across a secondary winding 106 in accord with the winding ratio of the primary to the secondary windings. The induced high voltage is supplied to a cold cathode fluorescent light FL to turn it on.

Capacitors 111-112 and resistors 117-118 are provided to detect the voltage impressed on the cold cathode fluorescent light FL and feed it back to a controller IC 200. Resistors 114-115 detect the current that flows though the cold cathode fluorescent light FL and feed it back to the controller IC 200. The capacitor 111 is adapted to resonate with the inductance of the transformer TR. The parasitic capacitance of the cold cathode fluorescent light EL also contributes to the resonance. Elements numbered 113, 116, 119, and 120 are diodes. Elements numbered 151 and 152 are capacitors provided to stabilize the power supply voltage.

The controller IC 200 has a multiplicity of input/output (I/O) pins. A first pin 1P is a mode switching terminal for switching operation made between PWM mode and intermittent operation mode (hereinafter referred to as burst mode). The first pin 1P is supplied with a duty signal DUTY for switching the operation mode and for determining the duty cycle ratio during the burst mode. A second pin 2P is a terminal (capacitive connection terminal) for connection with the capacitor 131 of a burst mode oscillator (BOSC). The second pin 2P connected to the capacitor 131 to generate across the capacitor a triangular signal (i.e. a triangular signal train) BCT for initiating a burst. The triangular signal will hereinafter be referred to as burst triangular signal.

A third pin 3P is a terminal for connection with a capacitor 132 to establish an oscillation frequency of a PWM mode oscillator (OSC). A triangular signal (i.e. a triangular signal train) CT for PWM (also referred to as PWM triangular signal CT) is generated at the third pin 3P connected to the capacitor 132. A fourth pin 4P is a terminal for connection with a resistor 133 for setting up a charge current to the third pin 3P. The fourth pin 4P has a potential RT, which causes a current to flow through the resistor 133 connected thereto in accord with the potential RT and the resistance of the resistor 133. A fifth pin 5P is an earth terminal having ground potential GND.

A sixth pin 6P is a terminal (referred to as resistance setting terminal) for connection with a resister (referred to as charge current setting resistor) 134 to set up a charging current passed to the third pin 3P. The charge current setting resistor 134 connected to the sixth pin 6P is connected in parallel with the resistor 133 or disconnected therefrom, under the control of an internal circuit of the controller IC 200. The sixth pin 6P has a potential SRT, which equals either the ground potential GND or the potential RT of the fourth pin 4P. A seventh pin 7P is a terminal for connection with a capacitor 135 for setting a timer latch. The capacitor 135 when connected to the seventh pin 7P, stores a charge, developing a voltage SCP in accord with the charge. The capacitor 135 determines the time limit of protective action to protect the internal circuit of the controller IC 200.

A ninth pin 9P is an input terminal of a first error amplifier. The ninth pin 9P is fed, via a resistor 140, with a current detection signal (referred to as detection current) IS in accord with the current flowing through the cold cathode fluorescent light FL. The detection current IS is inputted into the first error amplifier. An eighth pin 8P is an output terminal of the first error amplifier. Connected between the eighth pin 8P and the ninth pin 9P is a capacitor 136. The potential of the eighth pin 8P serves as feedback voltage FB, which becomes control voltage for the PWM control. In what follows the ground potential is taken as a reference for voltages unless otherwise stated.

A tenth pin 10P is an input terminal of a second error amplifier. The tenth pin 10P is fed, via a resistor 139, with a voltage detection signal (hereinafter referred to as detection voltage) VS in accord with the voltage impressed on the cold cathode fluorescent light FL. The detection voltage VS is inputted into the second error amplifier. Connected between the tenth pin 10P and the eighth pin 8P is a capacitor 137.

An eleventh pin 11P is a terminal for setting starting time and for starting up the inverter. A signal STB is derived from a delayed startup signal ST by removing the noise therefrom by means of a resistor 143 and a capacitor 142, and is supplied to an eleventh pin 11P. A twelfth pin 12P is a terminal for connection with a grounded capacitor 141 for setting slow-start time. A slow-start voltage SS gradually develops across the capacitor 141 at the time of a startup.

A thirteenth pin 13P is a synchronization terminal to be connected to another controller IC when the controller 200 is to be synchronized therewith. A fourteenth pin 14P is an I/O terminal of the internal clock, for connection with another controller IC when the controller 200 is to collaborate with said another controller.

A fifteenth pin 15P is an earth terminal for an external FET drive circuit. A sixteenth pin 16P is a terminal for outputting a gate drive signal N1 of the NMOS 102. A seventeenth pin 17P is a terminal for outputting a gate drive signal N2 of the NMOS 104. An eighteenth pin 18P is a terminal for outputting a gate drive signal P2 of the PMOS 103. A nineteenth pin 19P is a terminal for outputting a gate drive signal P1 of the PMOS 101. A twentieth pin 20P is a power supply terminal for receiving the power supply voltage VCC.

As shown in FIG. 2 illustrating the internal structure of the controller IC 200, an OSC block 201 generates a PWM triangular signal CT having a period of cycle determined by the capacitor 132 connected to the third pin 3P and the resistors 133-134 connected to the fourth pin 4P, and supply the signal CT to a PWM comparator 214. The OSC block 201 also generates an internal clock and supplies it to a logic block 203.

A BOSC block 202 is an oscillation circuit (hereinafter referred to as burst triangular signal and the circuit will be referred to as burst triangular signal generation circuit) for generating a burst triangular signal BCT having a frequency determined by the capacitor 131 connected to the second pin 2P. The frequency of a burst triangular signal BCT is set much lower than the frequency of the PWM triangular signal CT. (That is, BCT frequency<CT frequency.)

The dc voltage supplied to the first pin 1P (that is, analogue duty signal DUTY) and a burst triangular signal BCT are compared in a comparator 221. The output of the comparator 221 is used to drive an NPN transistor (hereinafter referred to as NPN) 234 via an OR circuit 239. In a case where a digital (PWM) duty signal DUTY is supplied to the first pin 1P, a resistor is connected to the second pin 2P to output a predetermined burst voltage from the BOSC block 202.

The logic block 203 is supplied with a PWM control signal, for example, to generate a switch drive signal in accord with a predetermined logic. An output block 204 generates gate drive signals P1, P2, N1, and N2, in accordance with the switch drive signal received from the logic block 203, and supplies them to the gates of the PMOSs 101 and 103 and NMOSs 102 and 104.

A slow start block 205 is supplied with the startup signal ST and is started up by the output of a comparator 217 when the slowly rising voltage STB raised by the capacitor 142 and resistor 143 and input to the comparator 217 exceeds a reference voltage Vref6. The output of the comparator 217 enables the logic block 203. A circuit 249 is an inversion circuit. The output of the comparator 217 resets a flip-flop (FF) circuit 242 via an OR circuit 243. As the start block 205 is started up, the slow start voltage SS gradually rises, which is inputted as a comparison input to the PWM comparator 214. Thus, during a startup, PWM control is controlled by the slow start voltage SS.

It is noted that during a startup, a comparator 216 turns off an NMOS 246 via an OR circuit 247 when the input to the comparator 216 exceeds a reference voltage Vref5. This causes the resistor 134 to be separated from the controller IC 200 and the frequency of the PWM triangular signal CT to be changed. The OR circuit 247 is also fed with the output of a comparator 213.

A first error amplifier 211 compares the detection current IS which is proportional to the current through the cold cathode fluorescent light FL with a reference voltage Vref2 (which is, for example, 1.25 V), and generates an output in accord with the error between them to control an NPN 235 connected to a constant-current source 11. The collector of the NPN 235 is connected to the eighth pin 8P. Thus, the potential of the node (i.e. the eighth pin 8P) serves as the feedback voltage FB to be inputted as a comparison input to the PWM comparator 214.

The PWM comparator 214 compares the triangular signal CT with either one of the feedback voltage FB or the slow start voltage SS that has a lower voltage than the other to generate and provide a PWM control signal to the logic block 203 via an AND circuit 248. Under steady state condition reached subsequent to a startup, a triangular signal CT is compared with the feedback voltage FB for automated control of the current flowing through the cold cathode fluorescent light FL at a preset level.

Because the capacitor 136 is connected between the eighth pin 8P and the ninth pin 9P, the feedback voltage FB increases and decreases smoothly. As a consequence, the PWM control is carried out smoothly, without an abrupt change.

A second error amplifier 212 compares the detection voltage VS, that is proportional to the voltage across the cold cathode fluorescent light FL, with a reference voltage Vref3 (which is 1.25 V, for example) to generate an output voltage indicative of the difference between them. This output is used to control a double-collector type NPN 238 having one collector, connected to the constant current generator 1I. Since the collector of the NPN 238 is also connected to the pin 8P, the feedback voltage FB is also controlled by the detection voltage VS. That is, the comparator 212 and the NPN 238 together constitute a feedback signal control circuit for controlling the feedback signal FB.

Incidentally, if the feedback voltage FB exceeds a reference voltage Vref1 (e.g. 3 V), a PNP transistor (hereinafter referred to as PNP) 231 will be turned on to limit a further excessive rise of the feedback voltage FB.

A comparator 215 compares the voltage generated by dividing the power supply voltage VCC by resistors 240 and 241 with a reference voltage Vref7 (e.g. 2.2 V), and, when the power supply voltage VCC reaches a predetermined level, inverts its output to reset the FF circuit 242 via the OR circuit 243.

A comparator 218 compares the slow start voltage SS with a reference voltage Vref8 (e.g. 2.2 V) to turn on the NPN 234 via an AND circuit 244 and an OR circuit 239 when the voltage SS exceeds the reference voltage Vref8. The NPN 234, when turned ON, causes a diode 232 to be reversely biased by a current source 12 and hence enables the first error amplifier 211 to perform its normal operation. Thus, the NPN 234, diode 232, and the current source 12 constitute a control mode switching circuit for switching the control mode between burst control and pulse width control mode.

When the NPN 238 having one of the double collectors, connected to a constant-current source 13 is turned ON by the second error amplifier 212, its collector voltage lowers below a reference voltage Vref (e.g. 3 V). This causes the output voltage of a comparator 219 to be reversed. A comparator 220 compares the feedback voltage FB with a reference voltage Vref10 (e.g. 3 V), and. inverts its output voltage when the feedback voltage FB exceeds the reference voltage. The outputs of the comparators 219 and 220 are inputted, along with the inverted output of the comparator 218, to a timer block 206 via an OR circuit 245, where the predetermined times are measured and outputted therefrom. The output of this timer block 206 is supplied to the FF 242 to reset it, and the Q output of which in turn disables the logic block 203.

Next, referring to the timing diagrams shown in FIGS. 3-4, and FIG. 5 illustrating operational conditions of the inverter, operation of the inverter will now be described.

More particularly, referring to FIG. 3, there is shown how a PWM control is performed while the duty signal DUTY exceeds a burst triangular signal BCT, that is, during an ON DUTY period. On the other hand, it is shown that the PWM control is halted while the duty signal DUTY is lower than the burst triangular signal BCT, that is, during an OFF DUTY period, thereby stopping supplying electric power to the cold cathode fluorescent light FL.

The frequency of the PWM triangular signal CT is 120 kHZ for example. This signal is controlled by the burst triangular signal BCT having a frequency of, for example, 150 Hz. Thus, no visual problem will be encountered. By controlling the magnitude of the duty signal DUTY, it is possible to control the power supply to the cold cathode fluorescent light FL (i.e. to control the amount of light emitted by the cold cathode fluorescent light FL) beyond the control range that can be attained solely by the PWM control.

Looking closely at the operation of the inverter circuit, it is understood that when the duty signal DUTY is below a burst triangular signal BCT, the output of the comparator 221 is held low (L level), thereby turning off the NPN 234.

Under this condition, the diode 282 is biased in the forward direction by the current generator 12; the input to the first error amplifier 211 is high; the NPN transistor 235 is switched on; and the feedback voltage FB is pulled down to a low voltage.

In this case, since the PWM comparator 214 compares the positive (+) triangular signal CT with one of the two negative (−) inputs having a lower voltage than the other, the comparator will not output a PWM control signal, as shown in the left end of FIG. 3.

Next, when the duty signal DUTY exceeds the burst triangular signal BCT, the NPN 234 is turned on, which in turn bias the diode 284 in the reverse direction and turns it off. Under this condition, since the detection current IS is small, the first error amplifier 211 generates an output in accord with the detection current IS inputted thereto to control the conductivity of the NPN 235. The collector voltage of the NPN 235, that is the feedback voltage FB, slowly rises on account of the capacitor 136 connected between the eighth pin 8P and ninth pin 9P to the predetermined constant feedback voltage. Accordingly, a PWM control signal is provided from the PWM comparator 214 to the logic block 203, thereby causing the gate drive signals P1-N2 to be outputted to the PMOSs 101 and 103 and NMOSs 102 and 104 for PWM control of these transistors.

Referring to FIGS. 4 and 5, logical procedure of forming gate drive signals P1-N2 in the logic block 203 and the output block 204 during the PWM control will now be described in detail.

Based on the PWM signal (i.e. PWM triangular signal CT) and the feedback voltage FB, a first gate drive signal P1 for driving the first semiconductor switch in the form of a PMOS 101, a second gate drive signal N1 for driving the second semiconductor switch in the form of an NMOS 102, a third gate drive signal P2 for driving the third semiconductor switch in the form of a PMOS 103, and a fourth gate drive signal N2 for driving the fourth semiconductor switch in the form of an NMOS 104 are generated such that a simultaneous OFF period Toff is established in which both the PMOS 101 and 104 are turned off and a simultaneous OFF period Toff is established in which both the PMOSs 103 and 102 are turned off. Furthermore, these gate drive signals P1-N2 are generated at the timing that the direction of the current flowing through the primary winding 105 of the transformer TR is switched from one direction to the other when the magnitude of the current is zero.

As shown in FIG. 4, during period i, the gate drive signal N1 is raised to a high level (H level); the gate drive signal P1 to a low level (L level); and the gate drive signal P2 to H level; and the PMOS 101 and NMOS 102 are turned on to allow the current to flow from the power supply BAT to the primary winding 105 (in the first direction). This condition of the bridge in period i is shown in FIG. 5 (a).

In period ii, a simultaneous OFF period Toff is formed during which the PMOS 103 and NMOS 102 are turned OFF simultaneously until the gate drive signals N1 and P2 are pulled down to L level, thereby preventing a penetration current to occur. During this period, although only the PMOS 101 is switched on, the current in the first direction keeps on flowing through the body diode of the PMOS 103 and through the PMOS 101 because of the energy stored in the transformer TR.

In the later half of the period ii, the gate drive signal P2 goes low (L level), thereby turning on the PMOS 103, which causes the current flowing through the body diode to transfer therefrom to the channel of the PMOS 103. This condition of the bridge in period ii is shown in FIG. 5 (b).

In period iii, the gate drive signal P1 goes high (H level), thereby turning off the PMOS 101. Yet, if the NMOS 104 is turned off, the current will flow in the first direction through the body diode of the NMOS 104 when there is a current flowing. Under this condition, the potential at the point marked @ is lower than VCC in the periods i and ii by a voltage drop Vf across the body diode. The condition of the bridge in period iii is shown in FIG. 5 (c).

As the current flowing in the first direction due to the energy stored in the transformer TR becomes zero, period iv begins. In this period iv, no current flows in the bridge as shown in FIG. 5(d), although only the PMOS 103 is turned on. Thus, in this invention, a condition is established, before the direction of the current in the primary winding 105 is changed, in which no current flows.

This zero-current condition prior to the switching of the current from one direction to the other can be attained by appropriately setting pulse widths in the PWM control in accord with the electric properties of the transformer TR, resonance capacitors 111 and 112, cold cathode fluorescent light FL, etc.

In period v, the gate drive signal P2 is low (L level) and the gate drive signal P1 is high (H level). If the gate drive signal N2 goes H level while the PMOS 103 is turned on, the NMOS 104 will be turned ON, permitting zero-current switching. With the PMOS 103 and NMOS 104 turned ON, a current flows in the second direction from the power supply BAT to the primary winding 105. This condition is shown in FIG. 5 (e).

In period vi, the gate drive signal N2 goes low (L level), which results in formation of a simultaneous OFF period Toff in which both of the PMOS 101 and. NMOS 104 are turned off, thereby preventing a penetration current from flowing until the gate drive signal P1 goes low (L level).

During this period, although only the PMOS 103 is switched on, the current continues to flow in the second direction through the body diode of the PMOS 101 and through the PMOS 103 on account of the energy stored in the transformer TR. In the later half of period vi, the gate drive signal P1 goes low (L level), causing the PMOS 101 to be turned ON, thereby transferring the current from the body of the diode to the channel of the PMOS 101. The condition of this period vi is shown in FIG. 5 (f).

A similar event takes place in period vii, in exactly the same manner as in period iii as described above, except that the direction of the current is reversed. This condition is shown in FIG. 5 (g). In a further period viii, the current flowing in the second direction becomes zero, leaving only the PMOS 101 turned on, as shown in FIG. 5 (h). The potential at the point marked @ changes as illustrated in the figure.

A zero-current switching is again executed when the current is reversed from the second to the first direction.

As described above, the NMOS 102 is switched on at every other apex on one side (lower edge for example) of the triangular signal CT with respect to the average level of the triangular signal CT and remains turned on until a triangular signal CT becomes equal in magnitude to the feedback signal FB immediately after said NMOS switch is turned on. The PMOS 101 is switched on a predetermined time before the NMOS 102 is turning on, and remains turned on until a triangular signal CT reaches its apex on the other side thereof (upper edge for example) immediately after the NMOS 102 is turned off. The NMOS 104 turns on at every other apex of the triangular signal CT which is different from the apices associated with the NMOS 102 but is on the same one side (e.g. lower edge) as the apices, and remains turned ON until a triangular signal CT becomes equal in magnitude to the feedback signal FB immediately after said NMOS switch is turned on. The PMOS 103 is switched on a predetermined time before the NMOS 104 is turned on while the PMOS 101 is turned on, and remains turned on until a triangular signal CT reaches its apex on the other side thereof (e.g. upper edge) immediately after the NMOS 104 is turned off.

The length of the predetermined times are set such that either one the PMOS 101 and PMOS 103 is always turned on. This implies that each of the PMOS 101 and PMOS 103 is switched on for a period longer than the period of cycle of the triangular signal CT.

In this way, the period over which a current is flowing through the body diode of a semiconductor switch (PMOS 101 or PMOS 103) is minimized while preventing penetration current from occurring, thereby making the energy loss accompanying the switching extremely small.

Alternatively, the PMOS 101 and PMOS 103 of FIG. 1 respectively serving as the first and the third switches can be replaced by NMOSs switches. In this case, the gate drive signals must also be changed accordingly.

Figure 6:
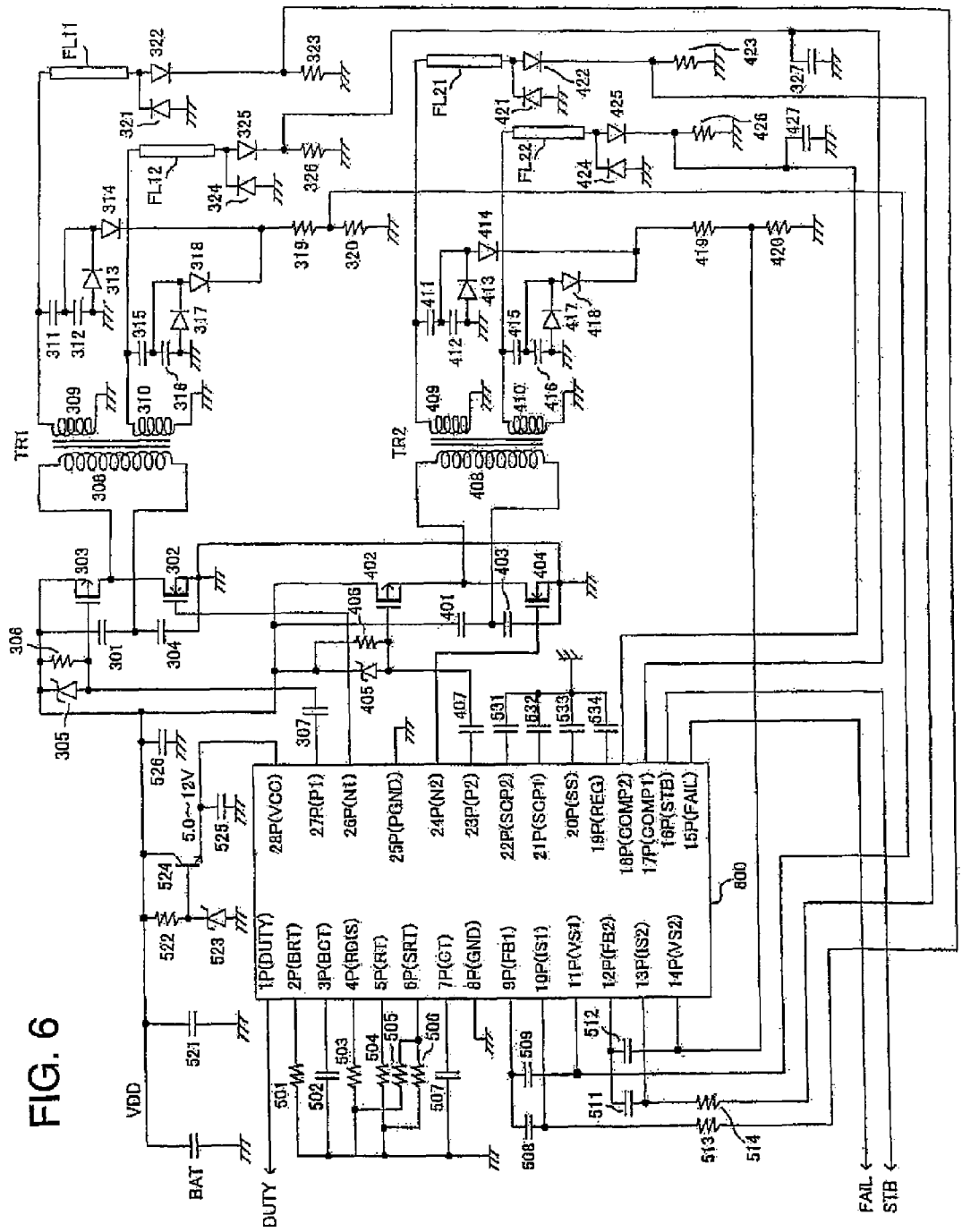
FIG. 6 is schematic diagram showing an over-all arrangement of an inverter in accordance with a second embodiment of the invention.
Figure 7:
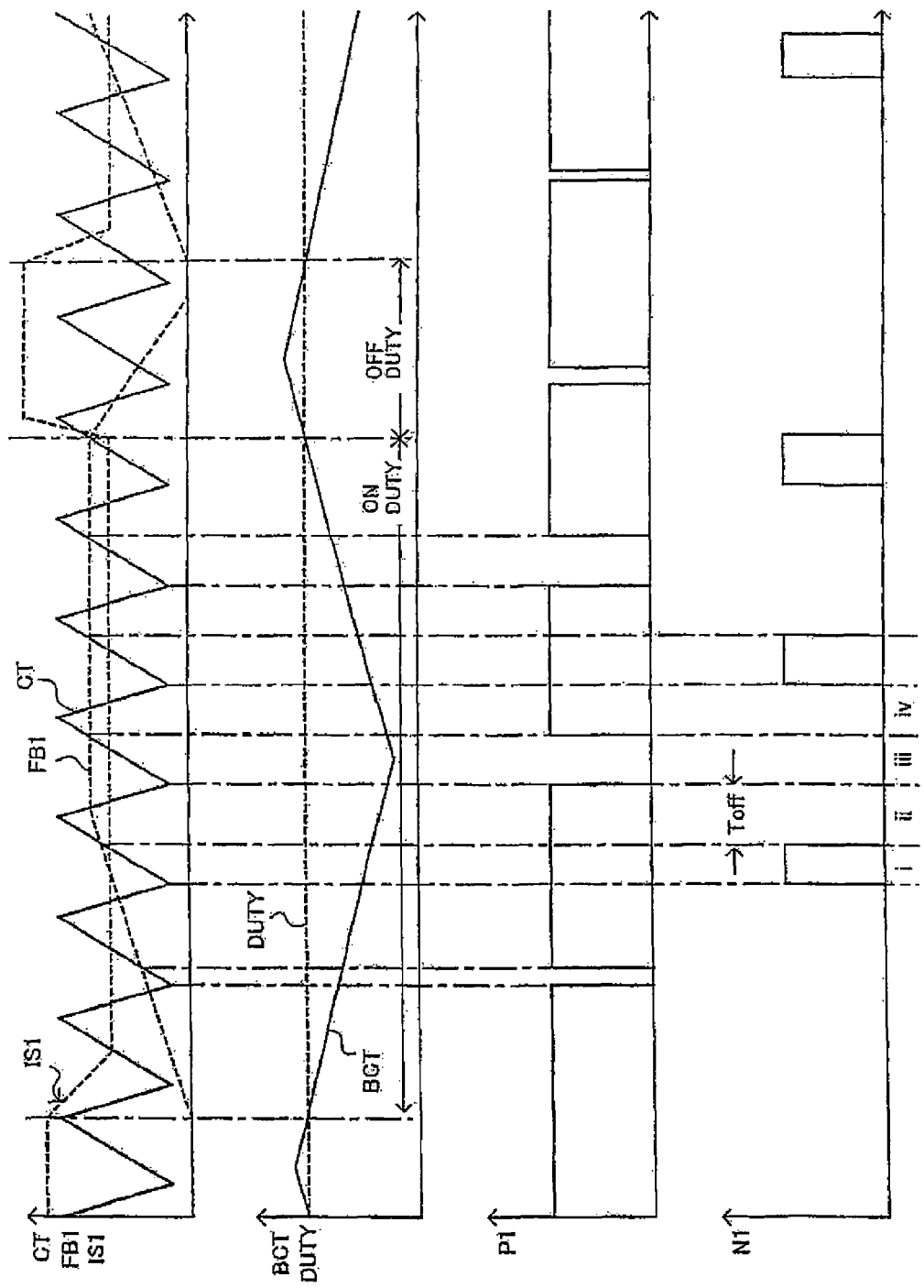
FIG. 7 is a timing diagram for the inverter of FIG. 6.

FIG. 6 shows an overall circuit arrangement of an inverter utilizing an insulated transformer and a half-bridge type switch circuit for performing PWM control in accordance with a second embodiment of the invention. FIG. 7 is a timing diagram for the inverter according to the second embodiment.

As shown in FIG. 6, the inverter is provided with two transformers TR1 and TR2 and a half-bridge type switching circuit for PWM control. Each of the transformers TR1 and TR2 has two secondary windings 309-310 and 409-410. This is an example where four cold cathode fluorescent lights FL11, FL12, FL21, and FL22 are connected to the respective second windings 309, 310, 409, and 410.

Referring to FIG. 6, a PWM control system of the first transformer TR1 will be described. The half-bridge type switch circuit establishes a current path in the first direction in the primary winding 308 of the transformer TR1 by means of a first capacitor 301 and a first switch in the form of NMOS 302. The switch circuit also establishes a current path in the second direction to the primary winding 308 of the transformer TR1 by means of a PMOS 303 serving as a second switch and a second capacitor 304. Each of the PMOS 303 and NMOS 302 has a body diode (or back gate diode). These body diodes allow currents to flow in the directions opposite to the normal directions thereof. Additional diodes may be provided to perform similar function as these body diodes.

A power supply voltage VDD is supplied from a dc power supply BAT to the primary winding 308 of a transformer TR1 via a PMOS 303, an NMOS 302, and capacitors 301 and 304 to induce high voltages in the secondary windings 309-310 in accord with the respective winding ratios of the primary to the secondary windings. The induced high voltages are supplied to the cold cathode fluorescent lights FL11 and FL12, thereby turning ON these fluorescent lights. Since the power supply voltage VDD of the dc power supply BAT differs from the power supply voltage VCC of a controller IC 600, a Zener diode 305, a resistor 306, and a capacitor 307 are provided to shift the level of the gate voltage of the PMOS 303.

Capacitors 311-312 and 315-316, together with resistors 319-320, detect the voltages impressed on the respective cold cathode fluorescent lights FL11 and FL12, and fed them back to a controller IC 600. Resistors 323 and 326 detect the currents flowing through the cold cathode fluorescent lights FL11 and FL12, and feed them back to the controller IC 600. Capacitors 311 and 315 are provided for respectively establishing resonance with the inductance of the transformer TR1. Parasitic capacitances of the cold cathode fluorescent lights FL11 and FL12 also contribute to the resonance. The inverter also includes diodes 313-314, 317-313, 321-322, and 324-325. A smoothing capacitor 327 is provided for smoothing the detection signal.

Elements of the inverter associated with the second transformer TRC (referred to as second inverter system) are denoted by reference numerals of the same numbering system as for corresponding elements associated with the transformer TR1 (referred to as first inverter system), starting with 401. For example, the primary winding is numbered 408 in correspondence with the primary winding 308. The same numbering system applies to other elements. For brevity, therefore, further description of the element of the second inverter system having reference numerals of the same numbering system will be omitted.

The controller IC 600 has a multiplicity of input/output (I/O) pins. The controller IC 600 has substantially the same pin arrangement and internal structure as the controller IC 200 of the first embodiment. However, this inverter has a partially different feedback system than the first embodiment in that this inverter has two systems associated with the first and the second transformers TR1 and TR2, respectively, and two cold cathode fluorescent lights FL11 and FL22 connected to the respective secondary windings of these transformers TR1 and TR2. different features of the controller IC 600 than the controller IC 200. A second pin 2P is a terminal for connection with a resistor 501 for setting up a charge-discharge current for a burst triangular signal BCT. A fourth pin 4P is a terminal for connection with a resistor 503 for setting up a discharge current for a PWM triangular signal CT. These terminals can be provided in the controller IC 200 as needed.

A fifteenth pin 15P is a terminal for externally outputting an error detection signal indicative of abnormality (referred to as abnormality detection signal) (which is equivalent to the output of FF 242 of FIG. 2). A seventeenth pin 17P and an eighteenth pin 18P are provided for reception of detection signals to protect the second cold cathode fluorescent light FL12 belonging to the first system associated with the first transformer TR1 and fluorescent light FL22 belonging to the second system associated with the second transformer TR2 from surge currents. The detection signals are compared with reference voltages of the internal comparators of the respective systems. A nineteenth pin 19P is a terminal for externally outputting the output voltage of an internal regulator.

Each of the first through twenty-eighth pins 1P-28P of the controller IC 600 corresponds to the respective pins of the controller IC 200 of the first embodiment having the same pin numbers and the same signal codes for example, DUTY corresponds to DUTY; FB1 and FB2 correspond to FB).

In the IC 600, a resistor 501 is connected between the ground and the second pin 2P; a capacitor 502 between the ground and the third pin 3P; the resistor 503 between the ground and the fourth pin 4P; a resistor 504 between the ground and the fifth pin 5P; resistors 505 and 506 between the ground and the sixth pin 6P; and a capacitor 507 between the ground and the seventh pin 7P, as shown in FIG. 6.

A capacitor 508 is connected between the ninth pin 9P and the tenth pin 10P for receiving a detection current IS1 via a resistor 513. A capacitor 509 is connected between the ninth pin 9P and the eleventh pin 11P for receiving a detection voltage VS1.

A capacitor 511 is connected between the twelfth pin 12P and the thirteenth pin 13P for receiving a detection current IS2 via a resistor 514. A capacitor 512 is connected between the twelfth pin 12P and the fourteenth pin 14P for receiving a detection voltage VS2. Further capacitors 531-534 are also provided.

Moreover, the voltage VDD of the dc power supply BAT is regulated to the predetermined power supply voltage VCC (in the range 5-12 V for example) by a series regulator that comprises a resistor 522, a Zener diode 523, and an NPN 524 before the voltage of the dc power supply BAT is supplied to the IC600. In addition, capacitors 521 and 526 for stabilizing the inverter are provided at suitable locations of the circuit.

Next, referring to the timing diagram shown in FIG. 7, operation of the inverter according to the second embodiment of the invention will now be described. FIG. 7 illustrates control system associated with the first transformer TR1. It should be understood that the internal structure, and hence the operation, of the IC600 are the substantially same as that of IC200 (FIG. 2) of the first embodiment.

Referring to FIG. 7, there is shown a timing diagram illustrating PWM control performed during a period in which the duty signal DUTY exceeds a burst triangular signal BCT, i.e. during an on-duty period (ON DUTY). On the other hand, during a period in which the duty signal DUTY is below the burst triangular signal BCT, i.e. during an off-duty period (OFF DUTY), the PWM control is suspended, stopping supplying electric power to the cold cathode fluorescent lights FL11 and FL12.

Since, in this embodiment too, the PWM triangular signal CT has a frequency of, for example, 100 kHz and is controlled, by a 300 Hz burst triangular signal BCT, no visual problem will occur. By controlling the magnitude of the duty signal DUTY, it is possible to control the power supply to the cold cathode fluorescent lights (i.e., to control the amount of light emitted by the cold cathode fluorescent lights) FL11-FL22 beyond the limit of control that can be attained solely by the PWM control.

Referring to the timing diagram of FIG. 7, the feedback voltage FB is limited to a low voltage while the duty signal DUTY is below a burst triangular signal BCT. Then, PWM control is not performed, so that, the gate drive voltage P1 is high (H level), and the gate drive voltage N1 is low (L level). As a consequence, the PMOS 303 and NMOS 302 maintain OFF status so that no electric power will be supplied to the transformer TR1.

Next, as the duty signal DUTY exceeds the burst triangular signal BCT, the feedback voltage FBI is slowly raised by the capacitor 508 connected between the ninth and tenth pins to a prescribed control voltage for the feedback. Thus, as a result of the PWM control in the IC 600, the gate drive signals P1 and N1 are outputted therefrom to the PMOS 303 and NMOS 302 to perform PWM control of these semiconductor switches.

Details of the PWM control will now be described. The gate drive signals P1 and N1 are generated such that a simultaneous OFF period Toff is established in which both the PMOS 303 and NMOS 302 are turned off. Furthermore, each of the gate drive signals P1 and N1 is generated at the timing that the direction of the current flowing in the primary winding 308 of the transformer TR1 is switched from one direction to the other when the magnitude of the current is zero.

As shown in FIG. 7, during period i, the gate drive signal N1 is H level and so is the gate drive signal P1, thereby causing a current to flow in a first direction from the power supply BAT to the primary winding 308 via the first capacitor 301 and the NMOS 302.

In period ii, gate drive signal N1 is pulled down to the L level, thereby establishing a simultaneous OFF period Toff in which both the PMOS 303 and NMOS 302 are turned OFF to prevent a penetration current from occurring. In the period ii, on account of the energy stored in the transformer TR1, the current continues to flow in the first direction through the body diode of the PMOS 303 and capacitors 301 and 304.

The current in the first direction will become zero when the energy stored in the transformer TR1 is exhausted. Thus, a condition of zero current is also established in the second embodiment before the direction of the current through the primary winding 308 is switched.

Such zero-current condition prior to the switching of the current direction can be attained by optimizing the pulse width in the PWM control in accordance with electric properties of the transformer TR1, resonance capacitors 311, 312, 315 and 316, cold cathode fluorescent lights FL11 and FL12, etc, involved.

In the period iii when the gate drive signal P1 has gone to L level, a current flows in the second direction from the power supply BAT to the primary winding 308 via the PMOS 303 and the second capacitor 304.

In period iv when the gate drive signal P1 is H level, a simultaneous OFF period Toff is established in which both the PMOS 303 and NMOS 302 are turned off, thereby preventing a penetration current from occurring. This continues until the gate drive signal N1 goes high (H level). In this period iv, on account of the energy stored in the transformer TR1, a current continues to flow in the second direction through the body diode of the NMOS 302 and the capacitors 301 and 304.

The current in the second direction will vanish when the energy stored in the transformer TR1 is exhausted. In this manner, a zero-current condition prior to the switching of the current in the primary winding 308 is also established in the second embodiment.

It will be understood that the PMOS 303 serving as a first switch may be replaced by an NMOS switch. In this case, the gate drive signal must be changed accordingly.

INDUSTRIAL APPLICABILITY

As described above, a dc-ac converter and a method of supplying ac power according to the invention are suitable for use as a back light power supply of a liquid crystal display, that requires a high ac voltage derived from a low voltage dc power source.

The invention claimed is:
1. A dc-ac converter, comprising:
a dc power supply;
a transformer having a primary side and at least one secondary side;
a switch circuit having
a first and a second semiconductor switches connected in series with each other via said primary side to allow a primary current from said dc power supply to flow through said primary side in a first direction, and
a third and fourth semiconductor switches connected in series with each other via said primary side to allow a primary current from said dc power supply to flow through said primary side in a second direction;
a current detection circuit for detecting a detection current associated with the current through a load connected to said secondary side;

a triangular signal generation circuit for generating a triangular signal train for pulse-width modulation (PWM);

a PWM circuit for generating a PWM signal upon comparison of a feedback signal based on said detection current received from said current detection circuit with said triangular signal train;

a logic circuit for generating a drive signal for driving said first semiconductor switch, said second semiconductor switch, said third semiconductor switch and fourth semiconductor switch in accordance with said PWM signal.

2. The dc-ac converter according to claim 1, further comprising:

a burst control signal generation circuit for generating a burst control signal for setting an on-duty period to control said first through fourth switches of said switch circuit based on said PWM signals and an off-duty period to disable said switch circuit irrespective of the PWM signals received, whereby the ratio of said on-duty period to said off-duty period is regulated.

3. The dc-ac converter according to claim 2, wherein said burst control signal generation circuit has an oscillator circuit for generating a burst triangular signal to initiate a burst, and is adapted to generate a burst control signal based on the comparison of said burst triangular signal with a duty signal having an arbitrarily adjustable magnitude.

4. The dc-ac converter according to claim 3, further comprising a control mode switching circuit for switching the mode of control between a burst control mode and a PWM control mode by deciding whether the magnitude of a detection current detected by the current detection circuit is to be limited to a predetermined level or not based on said burst control signal.

5. The dc-ac converter according to claim 1, wherein said logic circuit, based on said PWM signals, outputs switch signals that includes:

a first switch signal for switching on said first semiconductor switch, a second switch signal for switching on said second semiconductor switch, a third switch signal for switching on said third semiconductor switch, and a fourth switch signal for switching on said fourth semiconductor switch;

wherein said logic circuit is configured to establish a first simultaneous OFF period during which said first and fourth switches are simultaneously switched off, and switch the direction of said current flowing through said primary winding from one direction to the other when the magnitude of said current is zero.

6. A dc-ac converter, comprising:

a dc power supply;

a transformer having a primary side and at least one secondary side; a switch circuit having a first capacitor and a first semiconductor switch connected in series with each other via said primary side and adapted to allow a current to flow in a first direction from said dc power supply to said primary side;

a second capacitor and a second semiconductor switch connected in series with each other via said primary side and adapted to allow a current to flow in a second direction from said dc power supply to said primary side;

a current detection circuit for detecting a detection current associated with the current through a load connected to said secondary side;

a triangular signal generation circuit for generating a triangular signal train for pulse-width modulation (PWM);

a PWM circuit for generating a PWM signal upon comparison of a feedback signal based on said detection current received from said current detection circuit with said triangular signal train;

a logic circuit for generating a drive signal for driving said first semiconductor switch, said second semiconductor switch, said third semiconductor switch and fourth semiconductor switch in accordance with said PWM signal.

7. The dc-ac converter according to claim 6, further comprising:

a burst control signal generation circuit for generating a burst control signal for setting an on-duty period to control said first through fourth switches of said switch circuit based on said PWM signals and an off-duty period to disable said switch circuit irrespective of the PWM signals received, whereby the ratio of said on-duty period to said off-duty period is regulated.

8. The dc-ac converter according to claim 7, wherein said burst control signal generation circuit has an oscillator circuit for generating a burst triangular signal to initiate a burst, and is adapted to generate a burst control signal based on the comparison of said burst triangular signal with a duty signal having an arbitrarily adjustable magnitude.

9. The dc-ac converter according to claim 8, further comprising a control mode switching circuit for switching the mode of control between a burst control mode and a PWM control mode by deciding whether the magnitude of a detection current detected by the current detection circuit is to be limited to a predetermined level or not, based on said burst control signal.

10. The dc-ac converter according to claim 7, wherein said logic circuit, based on said PWM signals, outputs switch signals that includes:

a first switch signal for switching on said first semiconductor switch, a second switch signal for switching on said second semiconductor switch, a third switch signal for switching on said third semiconductor switch, and a fourth switch signal for switching on said fourth semiconductor switch;

wherein said logic circuit is configured to establish a first simultaneous OFF period during which said first and fourth switches are simultaneously switched off, and switch the direction or said current flowing through said primary winding from one direction to the other when the magnitude of said current is zero.

* * * * *